United States Patent

Malm

[15] 3,659,720

[45] May 2, 1972

[54] SEDIMENTATION SYSTEM

[72] Inventor: Lars G. Malm, Lindvagen, Sweden

[73] Assignee: AB Purac, Lund, Sweden

[22] Filed: Oct. 27, 1970

[21] Appl. No.: 84,388

[30] Foreign Application Priority Data

Oct. 31, 1969 Sweden..................................14985/69

[52] U.S. Cl...............................................................210/525
[51] Int. Cl...............................................................B01d 21/14
[58] Field of Search..........................................210/525, 523

[56] References Cited

UNITED STATES PATENTS 2,428,756  10/1947  Lind........................................210/525

*Primary Examiner*—Jim L. De Cesare
*Attorney*—Sughrue, Rothwell, Mion, Zinn & Macpeak

[57] ABSTRACT

A system for purifying water and sewage by forcing a liquid that is to be sedimented flow from the lower portion of a basin and upwards while sedimented matter in the liquid sinks downwardly in the basin. Concentrically positioned elements are located at the surface of the liquid for draining off purified liquid through fall pipes that interconnect the elements with discharge pipes at the bottom of the basin.

6 Claims, 2 Drawing Figures

Patented May 2, 1972

3,659,720

SEDIMENTATION SYSTEM

BACKGROUND OF THE INVENTION.

1. Field of the Invention

This invention refers to a novel type of sedimentation system.

2. Description of the Prior Art

In purifying water and sewage and in certain industrial processes circular or polygonal sedimentation basins are utilized to a great extend for separating material suspended in liquids. In order to provide effective separation the aim in this connection is to apply the so-called vertical sedimentation principle, according to which the suspension that is to be sedimented is conducted from below and upwards towards the surface of the liquid, with the separated material sinking to the bottom and being removed from there by means of specific arrangements.

Under ideal circumstances the sedimentation basin is basically embodied as a vertical pipe having a depth of liquid considerably exceeding the diameter of the pipe. This embodiment may be employed to a certain extent in very small sedimentation basins. However, in most cases the diameter of the pipe or basin is so great that the depth of liquid that is necessary for providing ideal conditions becomes unreasonably great in consideration of economical reasons and other reasons. The liquid to be sedimented is generally introduced at the center of the bottom portion of the pipe, and in most cases the clear water or purified water is drained off or drawn off from the surface of the liquid by means of conduits positioned in or at the circumference of the basin. This causes the flow of liquid to become more and more horizontal with an increasing diameter of the basin, which results in undesired flow phenomena.

However, it is possible to utilize the vertical sedimentation principle also in basins having greater diameters if the drain-off devices are distributed over the entire surface of the basin. A number of designs have been created for draining off the clear water from the surface of the liquid. Thus a circumferentially positioned conduit is sometimes utilized, which is combined with an appropriate number of radial conduits that are distributed over the entire surface of the liquid. In other cases concentric conduits are utilized, from which the water is drained off radially by means of connecting pipes or connecting conduits disposed in or below the surface of the liquid. Combinations of the above-mentioned types of design are also available. However, up to now, it has not been possible to utilize sedimentation basins of this type other than in particular cases with a small or comparatively moderate basin diameter, whereas in most cases it has been necessary to make use of sedimentation basins having a more or less pronounced horizontal flow of liquid. One of the reasons for this is that the drain-off conduits disposed on the surface of the liquid prevent the use of simple slime scrapers, it being necessary to utilize complicated and expensive structures instead for removing the matter that has settled on the bottom of the basin. For the same reason, it has not either been possible to solve the problem of removing so-called floating slime from the surface in an acceptable manner. Furthermore, it is difficult or impossible to arrange for suspending the conduits in basins having larger diameters for structural and economical reasons.

SUMMARY OF THE INVENTION

The object of this invention is to provide a solution to the drawbacks and problems indicated above and to make it possible to utilize the vertical sedimentation principle in sedimentation basins having large diameters. This is achieved by disposing at least one but preferably a plurality of concentrically positioned elements in the basin for drawing off the clear water phase and by making at least one but preferably a plurality of fall pipes interconnect said elements with discharge pipes that are disposed in connection with the bottom of the basin. The above-mentioned object and other objects, as well as the advantages thereof over existing and prior art forms, will become apparent in view of the following detailed description of the attached drawing and are accomplished as hereinafter described and claimed.

BRIEF DESCRIPTION OF THE DRAWING

The invention will be described more specifically below with reference to the accompanying drawing, in which.

DESCRIPTION OF THE PREFERRED EMBODIMENT

Figure 1:
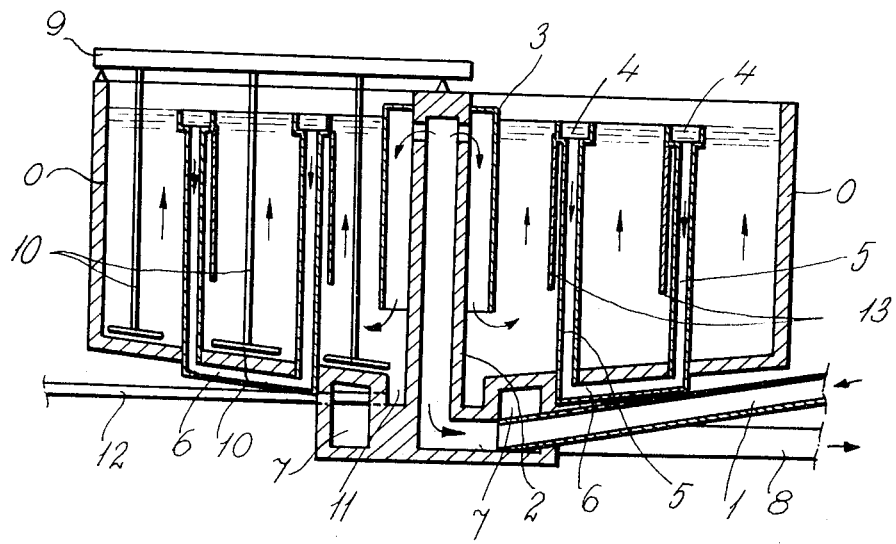
FIGS. 1 and 2 show an elevation and a horizontal projection, respectively, of a sedimentation basin designed in accordance with the invention and serving as an example, with FIG. 1 being a cross-section taken along the line I—I of FIG. 2. Identical designations have been utilized in the two figures wherever possible.
Figure 2:
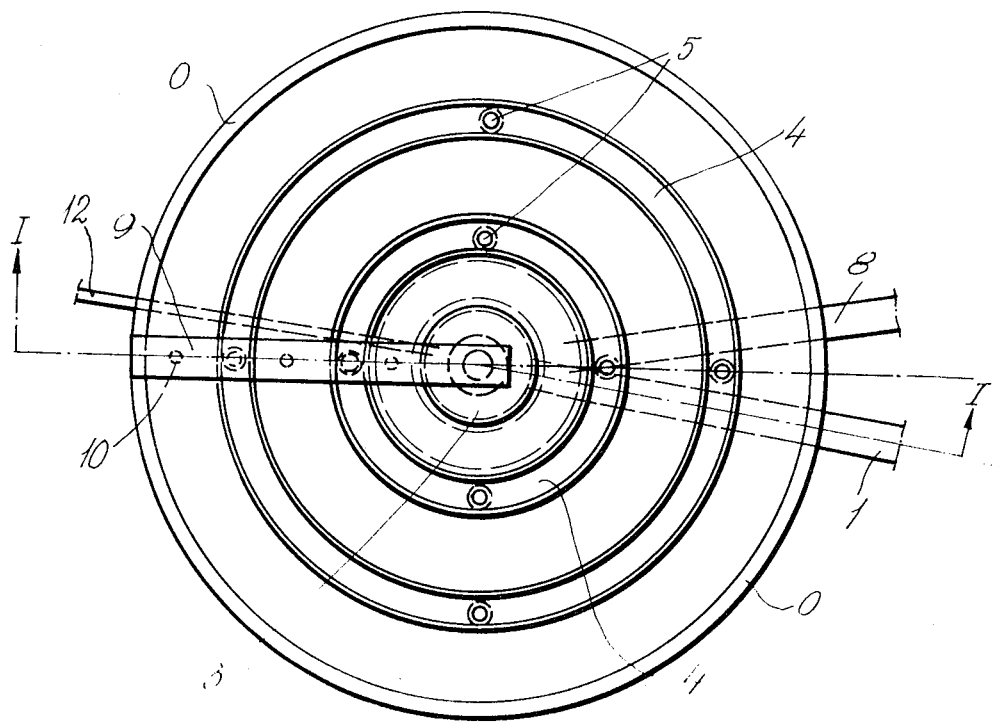

In the figures the designation 0 refers to a sedimentation basin in which the liquid to be sedimented is introduced in conventional manner through an inlet pipe 1 and a hollow central column 2. The liquid is made to descend to and to be distributed at an appropriate depth of liquid by means of an inlet cylinder 3, which if desired may be designed as an internal basin for carrying out pretreatment, as the case may be, for instance pre-airing, flocculating, or flotation. After the liquid has been distributed it will move in an upward direction simultaneously with separated matter sinking toward the bottom. In accordance with the invention, the purified water or clear water phase is drained off from the surface by means of concentrically disposed elements 4 so that it runs down through fall pipes 5 and collecting pipes 6 to a channel 7 and out through a discharge pipe 8. The designation 14 in FIG. 1 refers to the level of the liquid.

The matter settling on the bottom of the basin is removed in conventional manner by means of scrapers 10 suspended from a rotating bridge 9 which convey the settled matter to an annular sediment pocket 11 from which it is removed through a sediment discharge pipe 12.

The vertical sedimentation effect may be amplified by the volume of the basin being divided into three portions, which communicate with each other, by means of partitions 13. As the case may be, vertical sedimentation may also be carried out with basin diameters that are substantially greater with respect to the height of the basin than illustrated in FIG. 1 by the number of said communicating portions being increased by means of the partitions 13.

As a substantial advantage it may be mentioned that the concentrically disposed elements 4 may be affixed to the basin by means of the fall pipes 5.

The invention is not limited to the embodiment illustrated in the drawing, and this embodiment only comprises an example of the invention and of its utilization. Thus, for instance, the liquid may be introduced at the circumference instead of at the center of the basin, furthermore the discharge devices below the bottom of the basin may be constructed in different manners, etc. A plurality of different types of slime scrapers and inlet cylinders may also be utilized, and in addition the basin may be designed with a great number of structural modifications.

I claim:

1. A sedimentation system for purifying liquid having suspension comprising, a basin for holding liquid; a basin inlet pipe for flowing liquid, such as liquid having suspended matter into the basin, whereby the liquid in the basin will have an increasing degree of purity towards the upper surface end of the basin with sedimented matter sinking towards the bottom of the basin; a plurality of concentrically positioned elements disposed at approximately equal radial increments across the entire upper surface level of the liquid in the basin for drawing off the purified liquid in the basin from the entire surface portion of the liquid in the basin; a discharge pipe connected to the bottom of the basin for removing the purified liquid and a plurality of vertical fall pipes for interconnecting the concentrical positioned elements with the discharge pipe.

2. A sedimentation system in accordance with claim 1, comprising partitions disposed in connection with the concentrically disposed elements and and fall pipes, respectively, for dividing the basin into a plurality of concentrical portions communicating with each other.

3. A sedimentation system in accordance with claim 1, wherein the fall pipes affix the concentrically positioned elements of the basin.

4. A sedimentation system in accordance with claim 1, comprising means for physically pretreating a volume of liquid communicating with the external sedimentation volume around the center of the basin.

5. A sedimentation system as in claim 2 further including slime scraper means for scraping the bottom of the basin including individual scrapers suspended from the top of the basin and extending down between each pair of partitions.

6. A sedimentation system as in claim 2 wherein the fall pipes affix the concentrically positioned elements of the basin and each of the partitions extend the same depth into the liquid.

* * * * *